(12) United States Patent
Lisac et al.

(10) Patent No.: US 11,509,729 B2
(45) Date of Patent: *Nov. 22, 2022

(54) FIELD SERVICE MANAGEMENT MOBILE OFFLINE SYNCHRONIZATION

(71) Applicant: ServiceNow, Inc., Santa Clara, CA (US)

(72) Inventors: William Lisac, San Diego, CA (US); Daniel Cascais, San Diego, CA (US); Michael Borowiec, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/940,331

(22) Filed: Jul. 27, 2020

(65) Prior Publication Data

US 2020/0389532 A1 Dec. 10, 2020

Related U.S. Application Data

(63) Continuation of application No. 15/882,697, filed on Jan. 29, 2018, now Pat. No. 10,728,345.

(Continued)

(51) Int. Cl.
*H04L 67/51* (2022.01)
*H04L 67/1097* (2022.01)
(Continued)

(52) U.S. Cl.
CPC ............. *H04L 67/51* (2022.05); *G06F 9/547* (2013.01); *G06F 16/24552* (2019.01);
(Continued)

(58) Field of Classification Search
CPC ..... H04L 41/145; H04L 67/14; H04L 67/145; H04L 67/16; H04L 67/2842; G06F 16/2372
See application file for complete search history.

(56) References Cited

U.S. PATENT DOCUMENTS 6,321,229 B1 11/2001 Goldman
6,513,019 B2 * 1/2003 Lewis .................... G06Q 30/04
705/38

(Continued)

OTHER PUBLICATIONS

"Enabling Offline Capabilities in javaScript," Firebase, Sep. 19, 2017, retrieved from the internet https://firebase.goog.com/docs/database/web/offline-capabilities [retrieved on Sep. 22, 2017].
(Continued)

*Primary Examiner* — David R Lazaro
(74) *Attorney, Agent, or Firm* — Fletcher Yoder PC

(57) ABSTRACT

Service management incident data stored in a normalized format on a database is accessed from a hosted client instance responsive a REST API call by a client application on a mobile device in an online database session in an online mode between the hosted client instance and the client application. Responsive to an indication of the client application operating in offline mode, a batch request is executed on the database to generate a payload corresponding to a subset of the data, the payload having a denormalized format that is optimized for transmission to the mobile device and caching onto a local database on the mobile device for access in offline mode. Data from the cached subset of data stored on the local database is accessible by the mobile device in a simulated database session in the offline mode between the client application and the local database via a simulation API.

20 Claims, 6 Drawing Sheets

Related U.S. Application Data

(60) Provisional application No. 62/587,100, filed on Nov. 16, 2017.

(51) Int. Cl.
| | |
|---|---|
| *G06F 9/54* | (2006.01) |
| *G06F 16/27* | (2019.01) |
| *G06F 16/951* | (2019.01) |
| *G06F 16/2455* | (2019.01) |
| *H04L 41/00* | (2022.01) |
| *H04L 67/01* | (2022.01) |
| *H04L 67/568* | (2022.01) |
| *H04L 67/10* | (2022.01) |

(52) U.S. Cl.
CPC ............ *G06F 16/27* (2019.01); *G06F 16/951* (2019.01); *H04L 41/00* (2013.01); *H04L 67/01* (2022.05); *H04L 67/1097* (2013.01); *H04L 67/568* (2022.05); *H04L 67/10* (2013.01)

(56) References Cited

U.S. PATENT DOCUMENTS

| | | | |
|---|---|---|---|
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,224,683 B2 | 7/2012 | Manos | |
| 8,255,548 B2 * | 8/2012 | Hopkins | ............ H04L 67/2804 709/239 |
| 8,266,096 B2 | 9/2012 | Navarrete | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,887,133 B2 | 11/2014 | Behnia | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,171,049 B2 * | 10/2015 | Hopkins | .................. G06F 16/95 |
| 9,183,266 B2 * | 11/2015 | Hopkins | ............... H04L 41/145 |
| 9,235,631 B2 * | 1/2016 | Hopkins | ............. H04L 67/2804 |
| 9,239,857 B2 | 1/2016 | Trinon | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,535,737 B2 | 1/2017 | Joy | |
| 9,613,070 B2 | 4/2017 | Kumar | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 10,002,203 B2 | 6/2018 | George | |
| 10,728,345 B2 * | 7/2020 | Lisac | ...................... H04L 41/00 |
| 2007/0078950 A1 * | 4/2007 | Hopkins | ............. H04L 67/1095 707/E17.107 |
| 2015/0082239 A1 * | 3/2015 | Zhao | ...................... H04W 4/21 715/788 |
| 2016/0019348 A1 * | 1/2016 | Boston | ................... G16Z 99/00 705/3 |
| 2017/0353451 A1 * | 12/2017 | Metke | ................... H04W 12/06 |
| 2018/0075078 A1 * | 3/2018 | Dandy | ................. G06F 16/2372 |
| 2018/0146049 A1 * | 5/2018 | Africa | ................. H04L 41/0873 |
| 2019/0149619 A1 * | 5/2019 | Lisac | ...................... H04L 67/42 709/203 |
| 2020/0389532 A1 * | 12/2020 | Lisac | .................... G06F 16/951 |

OTHER PUBLICATIONS

"Realm Mobile Platform—A flexible platform for creating offline-first, reactive mobile apps effortlessly", retrieved from the Internet: URL:https://realm.io/products/realm-mobile-platform/ [retrived on Sep. 22, 2017].

"The Offline-First Approach to Mobile App development—Beyond Caching to a Full Data Synch Platrform", Mar. 30, 2017. Retrieved from the Internet: URL:https://go.pardot.com/l/210132/2017-03-30/zjmv?_ga=2.129828293.896524314.1505780820-1250286399. 1505780820 [retrived on Sep. 22. 2017].

* cited by examiner

FIELD SERVICE MANAGEMENT MOBILE OFFLINE SYNCHRONIZATION

CROSS-REFERENCE TO RELATED APPLICATIONS

This application is a continuation of U.S. patent application Ser. No. 15/882,697, filed Jan. 29, 2018, which claims priority to U.S. Provisional Patent Application Ser. No. 62/587,100 filed Nov. 15, 2017, and entitled "Field Service Management Mobile Offline Synchronization," the contents of which are incorporated herein by reference.

TECHNICAL FIELD

Embodiments described herein generally relate to cloud computing and in particular to generating a payload of field service management data in an optimized format for caching on a mobile device for use in an offline mode such that a mobile client application remains data source agnostic as to whether the data is sourced locally from the mobile device in the offline mode or from a server in an online mode.

BACKGROUND

Cloud computing relates to sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

Users may access cloud computing solutions with a variety of computing devices including portable computing devices such as mobile devices that are communicatively coupled to a hosted client instance of a cloud computing solution via the Internet. However, when a network connection is unavailable, users may be unable to access the cloud computing solution and related enterprise data on the portable computing device.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a method includes: providing, by one or more processors, a hosted client instance over a network interface on a cloud server for communicatively coupling with a mobile device for executing a client application associated with the hosted client instance; accessing, by the one or more processors from a database on the hosted client instance, service management incident data stored in a normalized format, wherein the service management incident data is accessed responsive a call to a representational state transfer application programming interface (REST API) of the database on the hosted client instance by the client application, and wherein the database is accessed in an online database session in an online mode between the hosted client instance and the client application of the mobile device; indicating, by the one or more processors, the client application is to operate in an offline mode during performance of a field service management operation; executing, by the one or more processors and responsive to the indication, a batch request on the database to generate a payload corresponding to a subset of the service management incident data, wherein the payload has a denormalized format that is optimized for transmission to the mobile device for consumption in the offline mode; and transmitting, by the one or more processors, the payload from the hosted client instance to the mobile device for caching onto a local database on the mobile device for access by the client application in the offline mode; wherein data from the cached subset of service management incident data stored on the local database of the mobile device is accessible by the mobile device in a simulated database session in the offline mode between the client application and the local database on the mobile device via a simulation API of the local database.

In another embodiment, the method may be embodied in computer executable program code and stored in a non-transitory storage device. In yet another embodiment, the method may be implemented on a cloud-based computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
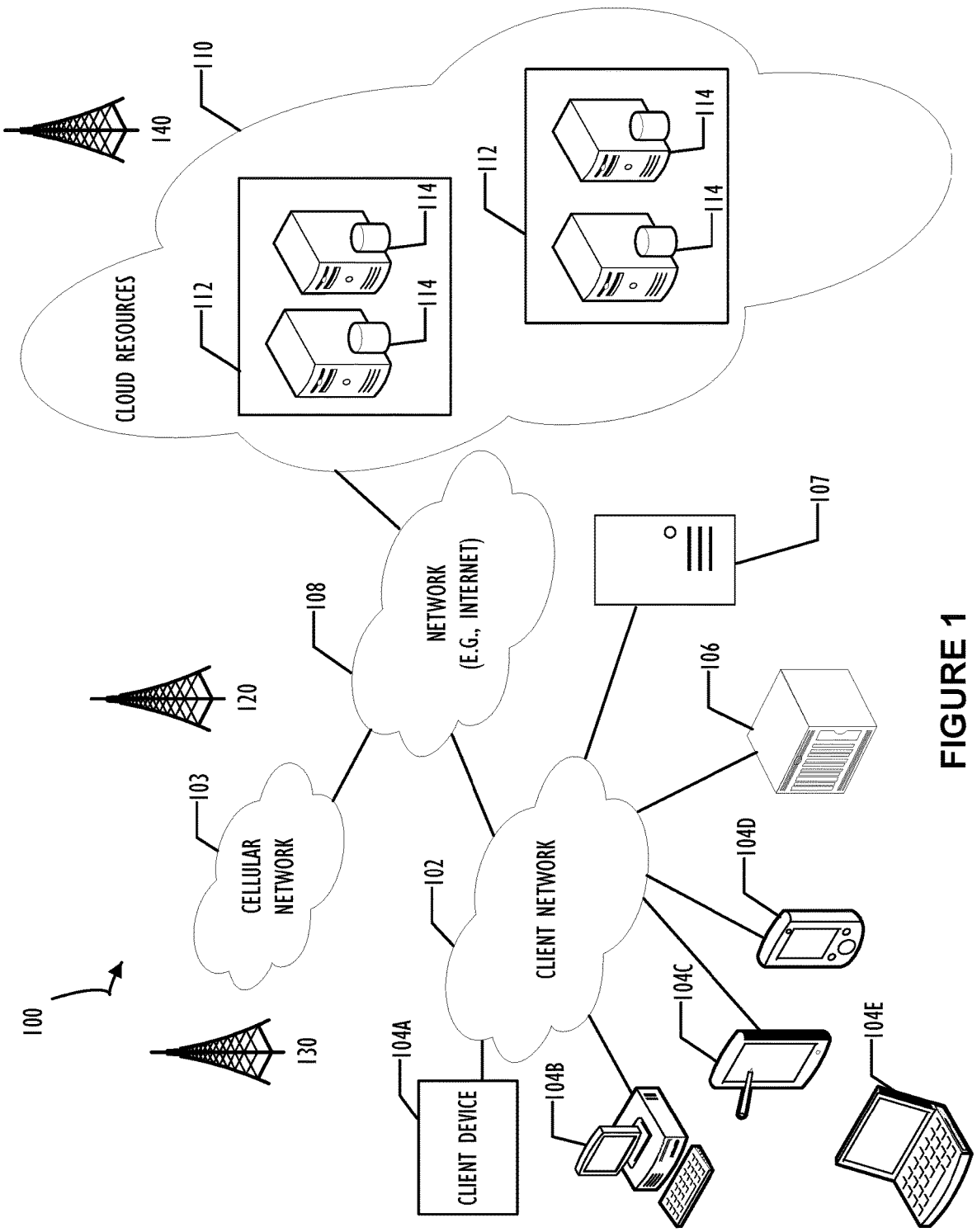
FIG. 1 illustrates a block diagram of cloud computing infrastructure 100 where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

This disclosure pertains to synchronizing data of an enterprise on a mobile device for use by a proprietary mobile application of the enterprise when the mobile device is in an offline mode. The data may be associated with field service management tasks or work orders that are assigned to a user of the mobile device and that are to be performed by the user while out in the field where the mobile device may not have network connectivity. The data may be a subset of the service management data that is stored on a cloud-server and may include incident list data, incident form data, related incident list data and record activity stream data. In an online mode, the client application on the mobile device may conduct an online database session with a hosted client instance of the enterprise on the cloud server to access the service management data from a database on the hosted client instance via a representational state transfer application programming interface (REST API) of the database. Responsive to a determination that the client application is to operate in an offline mode, a sync application programming interface (API) on the hosted client instance may execute a batch request on the database to generate a payload corresponding to a subset of the service management data that is to be cached on the mobile device for offline use. The payload may be generated and transmitted to the mobile device for caching onto a local database in a denormalized format that is optimized for transmission to the mobile device. In the offline mode, the client application on the mobile device may conduct a simulated database session with the local database on the mobile device via a simulation API to access the cached subset of service management data. The client application may remain data source agnostic in that a communication logic of the client application to access the service management data via the simulation API in the offline mode may be the same as a communication logic of the client application to access the service management data via the REST API from the cloud server in the online mode.

FIG. 1 illustrates a block diagram of an embodiment of a cloud computing infrastructure 100 where one or more embodiments of the present disclosure may operate. Cloud computing infrastructure 100 comprises a client network 102, network 108, and a cloud resources platform/network 110. In one embodiment, the client network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 102 represents an enterprise network that could include or be communicatively coupled to one or more local area networks (LANs), virtual networks, data centers and/or other remote networks (e.g., 108, 110). As shown in FIG. 1, client network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. FIG. 1 also illustrates that client network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between client network 102 and other networks such as network 108 and cloud resources platform/network 110. Local compute resource 106 may also facilitate communication between other external applications, data sources, and services, and client network 102. FIG. 1 also illustrates that client network 102 may be connected to a computer configured to execute a management, instrumentation, and discovery (MID) server 107. For example, MID server 107 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact with other mobile devices or with non-mobile devices such as desktop computer 104B and various types of client device 104A for desired services. Although not specifically illustrated in FIG. 1, client network 102 may also include a dedicated network device (e.g., gateway or router) or a combination of network devices that implement a customer firewall or intrusion protection system.

FIG. 1 illustrates that client network 102 is coupled to a network 108. Network 108 may include one or more computing networks, such as other LANs, wide area networks (WANs), the Internet, and/or other remote networks, in order to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via client network 102 and network 108. The cloud resources platform/network 110 acts as a platform that provides additional computing resources to the client devices 104A-E and/or client network 102. For example, by utilizing the cloud resources platform/network 110, users of client devices 104A-E may be able to build and execute applications, such as automated processes for various enterprise, IT, field service and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form of a multi-computing device (e.g., multiple physical hardware servers). Examples of server instances 114 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple client instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 110, and customer-driven upgrade schedules. An example of implementing a client instance within a multi-instance cloud architecture will be discussed in more detail below when describing FIG. 2.

Figure 2:
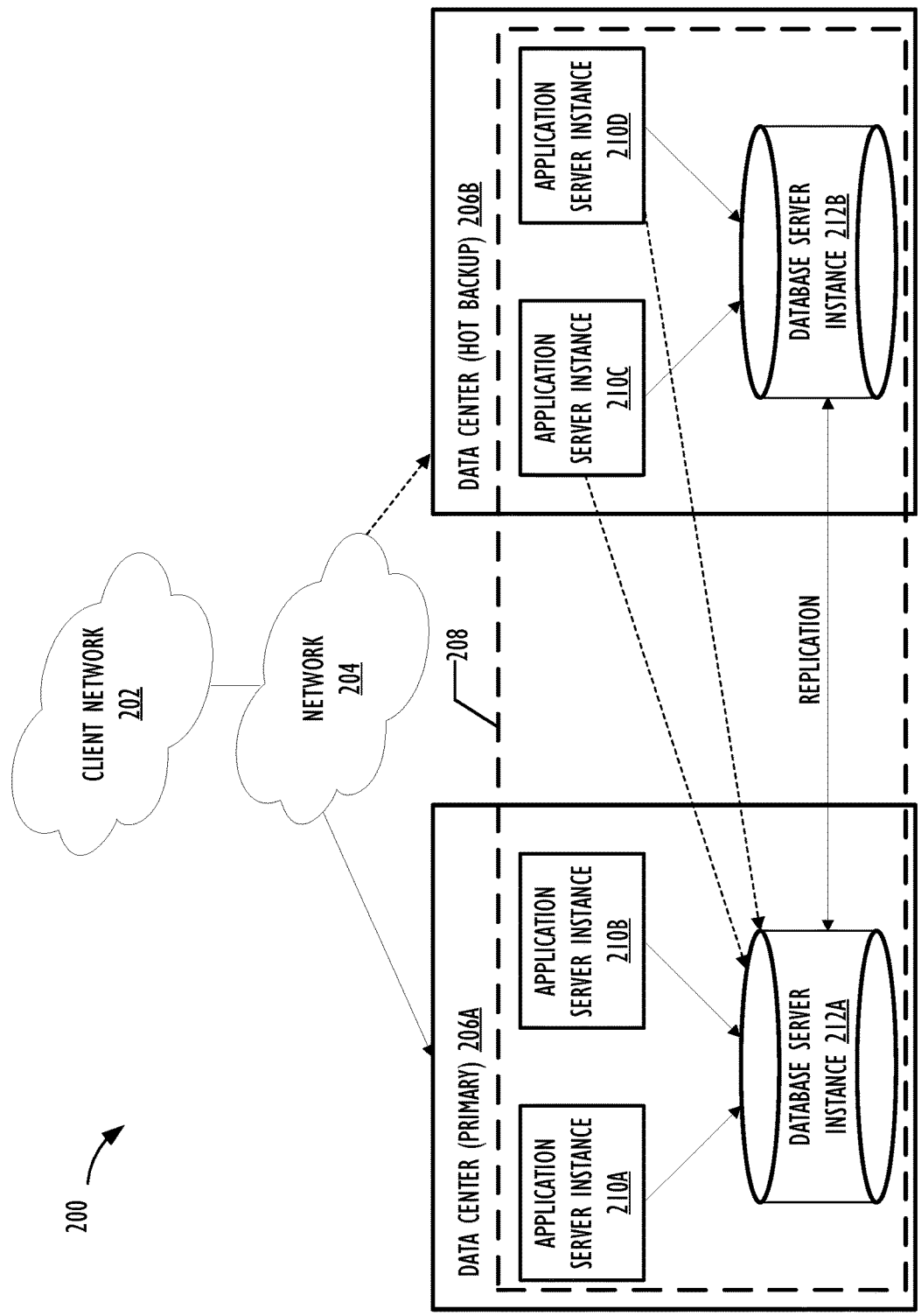
FIG. 2 illustrates a block diagram of multi-instance cloud architecture 200 where one or more embodiments of the present disclosure may operate.

In one embodiment, utilizing a multi-instance cloud architecture, a first client instance may be configured with a client side application interface such as, for example, a web browser executing on a client device (e.g., one of client devices 104A-E of FIG. 1). FIG. 2 illustrates a block diagram of an embodiment of a multi-instance cloud architecture 200 where embodiments of the present disclosure may operate. FIG. 2 illustrates that the multi-instance cloud architecture 200 includes a client network 202 that connects to two data centers 206A and 206B via network 204. Client network 202 and network 204 may be substantially similar to client network 102 and network 108 as described in FIG. 1, respectively. Data centers 206A and 206B can correspond to FIG. 1's data centers 112 located within cloud resources platform/network 110. Using FIG. 2 as an example, a client instance 208 is composed of four dedicated application server instances 210A-210D and two dedicated database server instances 212A and 212B. Stated another way, the application server instances 210A-210D and database server instances 212A and 212B are not shared with other client instances 208. Other embodiments of multi-instance cloud architecture 200 could include other types of dedicated server instances, such as a web server instance. For example, client instance 208 could include the four dedicated application server instances 210A-210D, two dedicated database server instances 212A and 212B, and four dedicated web server instances (not shown in FIG. 2).

To facilitate higher availability of client instance 208, application server instances 210A-210D and database server instances 212A and 212B are shown to be allocated to two different data centers 206A and 206B, where one of data centers 206 may act as a backup data center. In reference to FIG. 2, data center 206A acts as a primary data center that includes a primary pair of application server instances 210A and 210B and primary database server instance 212A for client instance 208, and data center 206B acts as a secondary data center to back up primary data center 206A for client instance 208. To back up primary data center 206A for client instance 208, secondary data center 206B includes a secondary pair of application server instances 210C and 210D and a secondary database server instance 212B. Primary database server instance 212A is able to replicate data to secondary database server instance 212B As shown in FIG. 2, primary database server instance 212A replicates data to secondary database server instance 212B using a replication operation such as, for example, a Master-Master MySQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for client instance 208 to be diverted to secondary data center 206B during a failure and/or maintenance scenario Using FIG. 2 as an example, if application server instances 210A and 210B and/or primary data server instance 212A fail and/or are under maintenance, data traffic for client instance 208 can be diverted to secondary application server instances 210C and 210D and secondary database server instance 212B for processing.

Although FIGS. 1 and 2 illustrate specific embodiments of cloud computing system 100 and multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only exemplary to facilitate ease of description and explanation.

Figure 3:
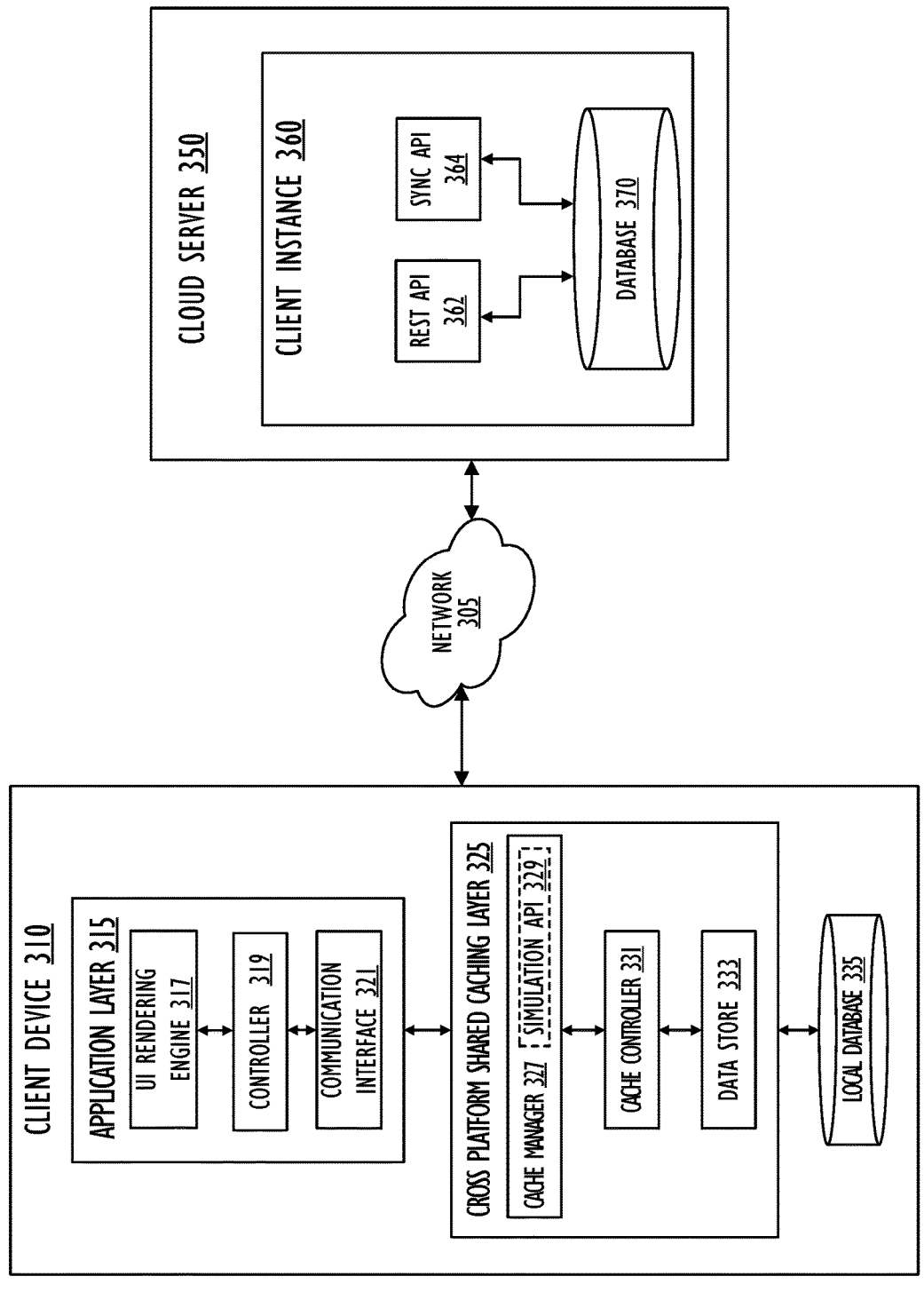
FIG. 3 illustrates a block diagram of mobile offline sync system architecture 300 where one or more embodiments of the present disclosure may operate.

FIG. 3 illustrates a block diagram of mobile offline sync system architecture 300 where one or more embodiments of the present disclosure may operate. Mobile offline sync system architecture 300 includes cloud server 350 that is communicatively coupled with client device 310 over network 305. Network 305 may include one or more computing networks, such as LANs, WANs, the Internet, and/or other remote networks, in order to transfer data between cloud server 350 and client device 310. Cloud server 350 may be similar to cloud resources platform/network 110 of cloud computing system 100 shown in FIG. 1. Client instance 360 may be hosted on the cloud server 350, and client instance 360 may be similar to client instance 208 of multi-instance cloud architecture 200 shown in FIG. 2. For ease of description, only relevant portions of client instance 360 are shown in FIG. 3 and described in detail. Client instance 360 may include REST API 362 and sync API 364 to interact with database 370 at a backend. The database 370 may be a relational database storing proprietary data in a normalized format including information of an enterprise implementing hosted client instance 360 with customized applications for the enterprise. For example, the database may include tables storing proprietary field service management data of the enterprise that helps the enterprise efficiently manage location-based work tasks or work orders of any kind for employees or customers of the enterprise that need to be performed on location out in the field. The field service management data and associated enterprise level cloud-based software may enable users of hosted client instance 360 with appropriate privileges to match field service tasks or work orders in database 370 to agents based on skills, geographic proximity, and available inventory. Agents may then do the work and track their travel and work time using an application that is associated with client instance 360 and that runs on client device 310. While in offline mode, agents may be able to view their tasks on client device 310 and have context information around their tasks while they complete them. For example, a centralized information technology (IT) department may select IT agents based on skills and territories, then send them out to remote offices to fix computers, install servers, and perform printer maintenance. Field service management data associated with the work orders and tasks may be made available to respective IT agents using the application at application layer 315 on client device 310.

Database 370 may store the field service management data in a normalized format that reduces data redundancy and improves data integrity. The field service management data may be stored in database 370 as records in one or more tables. The records may be displayed on corresponding forms including fields corresponding to columns of the table. The stored data may be accessed to obtain a list including a set of records from database 370 that satisfy one or more predetermined conditions. The data may also be obtained as an activity stream that includes a list of entries in records and conversations. Examples of activity streams include journal fields like comments and work notes that may display in task records. Activity stream may be a list activity stream that streams live activity information for all records on a current list.

REST API 362 and sync API 364 may include a set of REST APIs that define how client instance 360 may interact with data on database 370. In an online mode, responsive to an operation of a user on client device 310, client instance 360 may access database 370 to obtain field service management data using REST API 362 to make the data available to client device 310 via network 305 for presenting the data on client device 310. REST API 362 may include multiple end points with the ability to access all field service management data as well as the ability to modify the data. Exposing all field service management data on database 370 using REST API 362 may enable users of client instance 360 to create custom applications that utilize the data on database 370. Implementing REST API 362 may improve performance over conventional implementations for data access by reducing overhead and simplifying codebase. For example, a sample request to retrieve one or more records from database 370 to be displayed as one or more forms or lists or activity streams on client device 310 may be implemented by making one or more requests to corresponding APIs out of REST API 362. In response, client device 310 may receive field service management data as key-value pairs in, for example, JavaScript Object Notation (JSON) file format from the corresponding REST API 362.

Sync API 364 includes a set of REST APIs that are optimized for synchronizing batch record data from database 370 onto local database 335 of client device 310. Batch record data may correspond to a subset of the field service management data stored on database 370. Access to sync API 364 may be restricted only to certain users of client instance 350 that have predetermined privileges and roles in the enterprise. Sync API 364 provides efficient server side logic to generate a payload that is optimized for efficiency and that is transmitted to mobile device for use in offline mode. The optimization may include querying data by executing a batch request that triggers a background job for running multiple queries on database 370 and transmitting the resulting data in an optimized denormalized format for storage on local database 335 of client device 310. Generating the payload that is in the optimized format allows server 350 to quickly respond to a sync request from client device 310 by reducing a size of the payload to be delivered to client device 310 and also allows server 350 to be memory and query efficient when executing the batch request. Operations performed by sync API 364 to efficiently generate the optimized payload will be described in more detail below with reference to flowcharts 400 and 500 shown in FIGS. 4 and 5.

Client device 310 may be a device on client network 102 of FIG. 1. In another embodiment, client device 310 may be a device on cellular network 103 of FIG. 1 and communicatively coupled to cloud server 350 via network 305. Client device 310 may be similar to any of client devices 104A-E of cloud computing system 100 shown in FIG. 1. Client device 310 may include application layer 315, cross platform shared caching layer 325 and local database 335. Cross platform shared caching layer acts as a middle layer to enable communication between application layer 315 and local database 335. Application layer 315 includes an application that enables agents of client instance 360 to optimize field work with a mobile interface that allows the agents to accept or reject tasks or work orders, track travel and work time spent on tasks, use questionnaires to collect and complete necessary task details, and collect customer signatures acknowledging work completion. Application layer 315 is a platform specific (for e.g., iOS, Android or Windows Mobile specific) layer to enable the application at application layer 315 to run on a variety of platforms. Application layer 315 includes user interface (UI) rendering engine 317, controller 319, and communication interface 321. Communication interface 321 may communicate with cloud server 350 by making a network call to REST API 362 in the online mode or may communicate with cross platform shared caching layer 325 by making a call to simulation API 329 in the offline mode. Communication interface 321 obtains data and responds to controller 319 with the data to present a UI including the obtained data on a screen of client device 310 via the UI rendering engine 317. Application layer 315 is data source agnostic in that application layer 315 does not distinguish between whether the data is sourced locally from local database 335 on client device 310 in the offline mode or sourced from server 350 in the online mode. Application layer 315 remains data source agnostic by including a predefined set of interface configurations that vary depending on whether the application is online or offline and by making cross platform shared caching layer 325 mimic server 350. Programming the application is simplified using the predefined interface configurations because the configurations eliminate all conditional logic relating to the application at application layer 315 behaving one way when the application is offline and another way when the application is online.

Cross platform shared caching layer 325 may seamlessly mimic the server 350 for application layer 315 in offline mode by enabling interaction with data on local database 335. Cross platform shared caching layer 325 may simplify application layer 315 by making application layer 315 handle only presentation logic for presenting data on UI of client device 310 and handling all business logic and communication logic within cross platform shared caching layer 325. When application layer 315 is in offline mode, cross platform shared caching layer 325 may be enabled to handle all platform requirements of application layer 315, and when application layer 315 is online, cross platform shared caching layer 325 may handle communication and instruct application layer 315 to place a network call to cloud server 350 for data instead of fetching the data from local database 335. Cross platform shared caching layer 325 may include cache manager 327, cache controller 331 and data store 333. Cache manager 327 may act as a server shim to communicate with application layer 315. In particular, cache manager 327 may serve as an entry point to the underlying caching logic that application layer 315 may interact with. In one embodiment, cache manager 327 may be a wrapper for a corresponding class of routines/sub-routines written in a programming language such as C or C++. In offline mode, application layer 315 may communicate with simulation API 329 of cache manager 327 which acts as a standard set of REST APIs communicating data as key-value pairs in, for example, JSON file format. Cross platform shared caching layer 325 may store data received in an optimized format from cloud server 350 into local database 335 and perform data manipulation on the optimized format data pulled out from local database 335 to respond to application layer 315 in offline mode in a way that is similar to application layer 315 communicating directly with REST API 362 to obtain data during online mode. As a result of the communication logic within cross platform shared caching layer 325, hot swapping REST network calls to REST API 362 for local calls to simulation API 329 may be transparent to application layer 315. More specifically, application layer 315 may request simulation API 329 to fetch a single record or a list of records of field service management data from local database 335 in offline mode. Simulation API 329 may then in turn dive into cache controller 331 who may obtain requested data from local database 335 and transform the data from the optimized format in which the data is stored in local database 335 into a standard user-friendly format that mimics server-side REST API 362 that application layer 315 is used to using while in online mode. Cache manager 327 may include a cross platform core component that implements simulation API 329 and cache manager 327 may further include a native component that is platform specific (e.g., iOS, Android, or Windows Mobile) to application layer 315. The native component may act as an API that can be consumed by application developers to simplify application development on various platforms while ensuring compatibility with the core component of cache manager 327 which may be written in a programming language like C or C++. Thus, the native component of cache manager 327 may enable communication with the application layer 315 even if the application layer 315 is written in a programming language that is different from that of the core component of cache manager 327. For example, application layer 315 may be written in Objective C, Objective C++, or Java, and core cache manager 327 may be a C or C++ library.

Local database 335 is a database that may store data received from cloud server 350 in an optimized denormalized format for offline use. For example, local database 335 may be a SQLite database. Data store 333 adds or removes a wrapper around the data stored in local database 335 to enable interaction with the data in a convenient manner. For example, data store 333 may add or remove the wrapper to enable interaction with the data stored in JSON key-value pairs in local database 335. Cache controller 331 transforms data from the optimized denormalized format as stored in local database 335 into a format that is suitable for presenting on the UI in application layer 315. In one embodiment, data stored in local database 335 may include list layout data, form layout data and table metadata, record data, record metadata, and record's activity stream data, list relationships and related list relationships data between lists and records.

Figure 4:
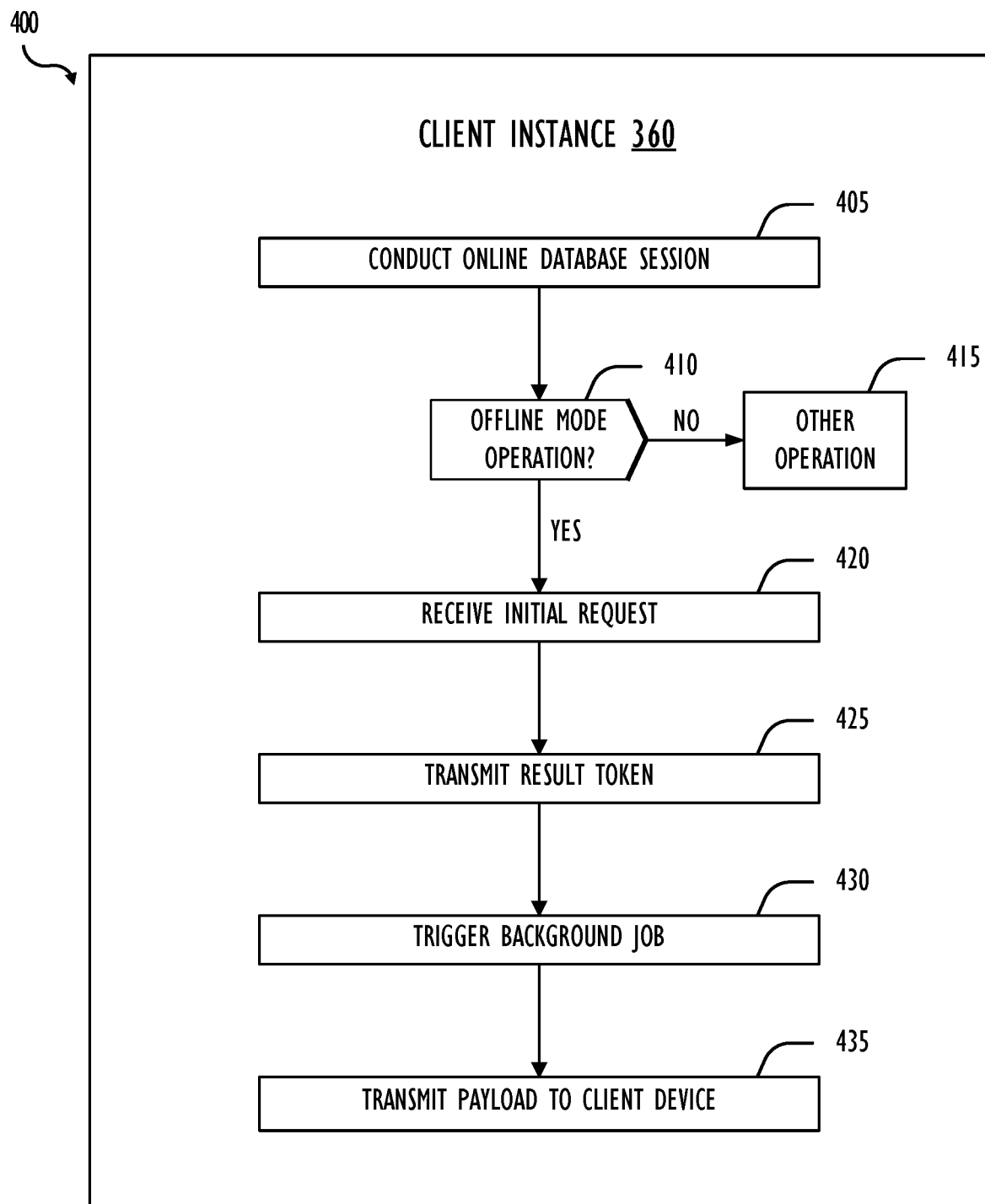
FIG. 4 shows flowchart 400 illustrating operation of client instance 360 of FIG. 3 in accordance with one or more disclosed embodiments.

FIG. 4 shows flowchart 400 illustrating operation of client instance 360 of FIG. 3 in accordance with one or more disclosed embodiments. Flowchart 400 begins at block 405 with client instance 360 conducting an online database session in online mode with client device 310. In the online mode, communication interface 321 communicates with REST API 362 to interact with field service management data stored in database 370. Based on an operation performed by a user of client device 310, controller 319 may control UI rendering engine 317 to accept user input and instruct communication interface 321 to fetch data from database 370 by making a network call to REST API 362. The data may be incident or task data associated with one or more field service tasks assigned to the user of client device 310. Communication interface 321 may receive field service management data as key-value pairs in, for example, JSON file format from REST API 362, and UI rendering engine 317 may present the received data on a UI of client device 310 as a list, form, record, activity stream, related record, and the like. At step 410, client instance 360 determines whether the application at application layer 315 on client device 310 is to operate in offline mode to predict whether a subset of data on database 370 is to be synchronized onto local database 335 of client device 310. In one embodiment, the determination to operate the application at application layer 315 in offline mode is made responsive to a user of client device 310 performing an operation on client device 310 to manually place the application at application layer 315 in offline mode. In this case, client device 310 may explicitly require the user of the application to synchronize related data from server 350 onto local database 335 before going offline. Alternately, the determination to operate the application at application layer 315 in offline mode may be automatically made responsive to one or more operation conditions of application layer 315. For example, the one or more operation conditions may include geographic location information of a job site of a field service task or work order assigned to client device 310; elapsed time information of a time elapsed since a previous caching of data on local database 335 of client device 310; and network information indicating a quality of a network connection between client device 310 and client instance 360. More specifically, if a job site of a field service task or work order assigned to a user of client device 310 is marked as being in a geographic location that is known to have poor network connectivity and the user of client device 310 is scheduled to go to the job site to complete a task, client instance 360 may determine at block 410 that application layer 315 is to operate in the offline mode. In this case, client instance 360 may send a notification in background to client device 310 to rouse the application at application layer 315 and to cause the application to initiate a request to synchronize data from database 370 onto local database 335 ahead of the visit to the job site. Further, a table on database 370 may store known list of geographic locations where field service agents using client device 310 may visit to complete field service tasks associated with client instance 360. A Boolean flag corresponding to each of those locations may be stored in database 370 to indicate whether that location has poor connectivity. As a field service job is scheduled for a job site, client instance 360 may access the corresponding Boolean flag of the location of the job site to determine whether client device 310 associated with the field service job is to operate in offline mode.

If client instance 360 determines that application layer 315 of client device 310 is not to operate in offline mode ("NO" at block 410), client instance 360 performs other operation at block 415. If client instance 360 determines that application layer 315 of client device 310 is to operate in offline mode ("YES" at block 410), responsive to, for example, a sync notification transmitted from client instance 360 to client device 310, sync API 364 of client instance 360 may receive an initial request at block 420 from communication interface 321 to synchronize data onto local database 335. Responsive to the initial request, sync API 364 may create a batch request record in a mobile offline result table in database 370 and may also create a trigger record in a trigger table in database 370 to service the batch request record. Sync API 364 may then return an identifier of the batch request record to communication interface 321 of application layer 315 as a result token (block 325). At block 430, sync API 364 at client instance 360 may trigger a background job based on the trigger record and the batch request record to generate a payload of a subset of the field service management data on database 370 to respond to the initial request from client device 310. The payload may include an entry for each field service management data record that is responsive to the initial request and may contain a list of records, all field data necessary to display each record in the list as well as to display the record's form based on a view passed to sync API 364 in the initial request, activity stream data for each record whose form displays an activity stream, all data necessary to display each record's related lists and related records' forms. Requests against a parent table (e.g., tasks table) on database 370 may include all relevant data from extended tables for each record. Related lists may also contain expanded data. The payload may also include layout information for all table/view combinations that are required to render the data in the result. The background job may generate the payload and attach a result.json file to the batch request record and may then mark the record as finished. Communication interface 321 may then retrieve the result including attached payload using the result token, and the attachment may be streamed to cross platform shared caching layer 325 (block 435) of client device 310. A synchronization level of the payload may be one level deep to include list and form data and one level down of related list and form data including references.

Sync API 364 generates the payload in a highly optimized and denormalized format for efficient synchronization of data on client device 310. Traditionally, fetching the data responsive to the initial request may be accomplished by executing hundreds of REST API network calls one at a time while client device 310 is online. For example, client device 310 may make a call for obtaining a list of records, another call for one record on the list, yet another call for related lists of the record, and so on. By contrast, instead of making numerous queries into database 370, sync API 364 is optimized for making a single big batch request into database 370 efficiently and serialize the data to disk to come one at a time and then respond back to client device 310 with a payload in a denormalized format when the payload is ready, thereby reducing network calls and SQL querying. Further, instead of making communication interface 321 continuously wait for a response payload to the initial request, sync API 364 triggers a background job onto database 370 to generate the payload and simultaneously responds back to communication interface 321 to acknowledge receipt of the initial request and confirm that the request has been accepted for processing. Communication interface 321 may then periodically (or occasionally at irregular intervals) ping sync API 364 to determine whether execution of the background job has completed, and when execution of the background job has completed, sync API 364 responds to the most recent received ping request from communication interface 321 with the optimized payload responsive to the initial request by including the payload in a body of the response. Thus, data retrieval by sync API 364 is heavily optimized to allow large result sets to be returned quickly without creating memory pressure on client instance 360. Further, the background job is used to ensure that large offline data requests don't hold UI threads. In order to generate the optimized payload and allow for efficient inclusion of related list data in the payload, a record on a main table in database 370 may be ordered by an identifier, and related list records may be ordered by their foreign key reference. This may allow records from related lists to be queried for multiple records simultaneously and then merged into each record on the main table as necessary, since all related list data may be in the same order as data from the main table. Records for both the main table and related lists may be iterated over a two pass implementation where a first pass may pull in both identifier and class name fields, and then a second pass may perform multiple queries per block—one query per unique class name in that block. Sync API 364 further includes logic to serialize records in the output payload, augment the record data with the activity stream and related list data, and serialize related list record data. Since the initial request simply queues the background job, the initial request sync API transaction will complete almost immediately. The background job will then execute on database 370 to complete the batch request by executing numerous queries corresponding to the batch request and generate the payload.

Figure 5:
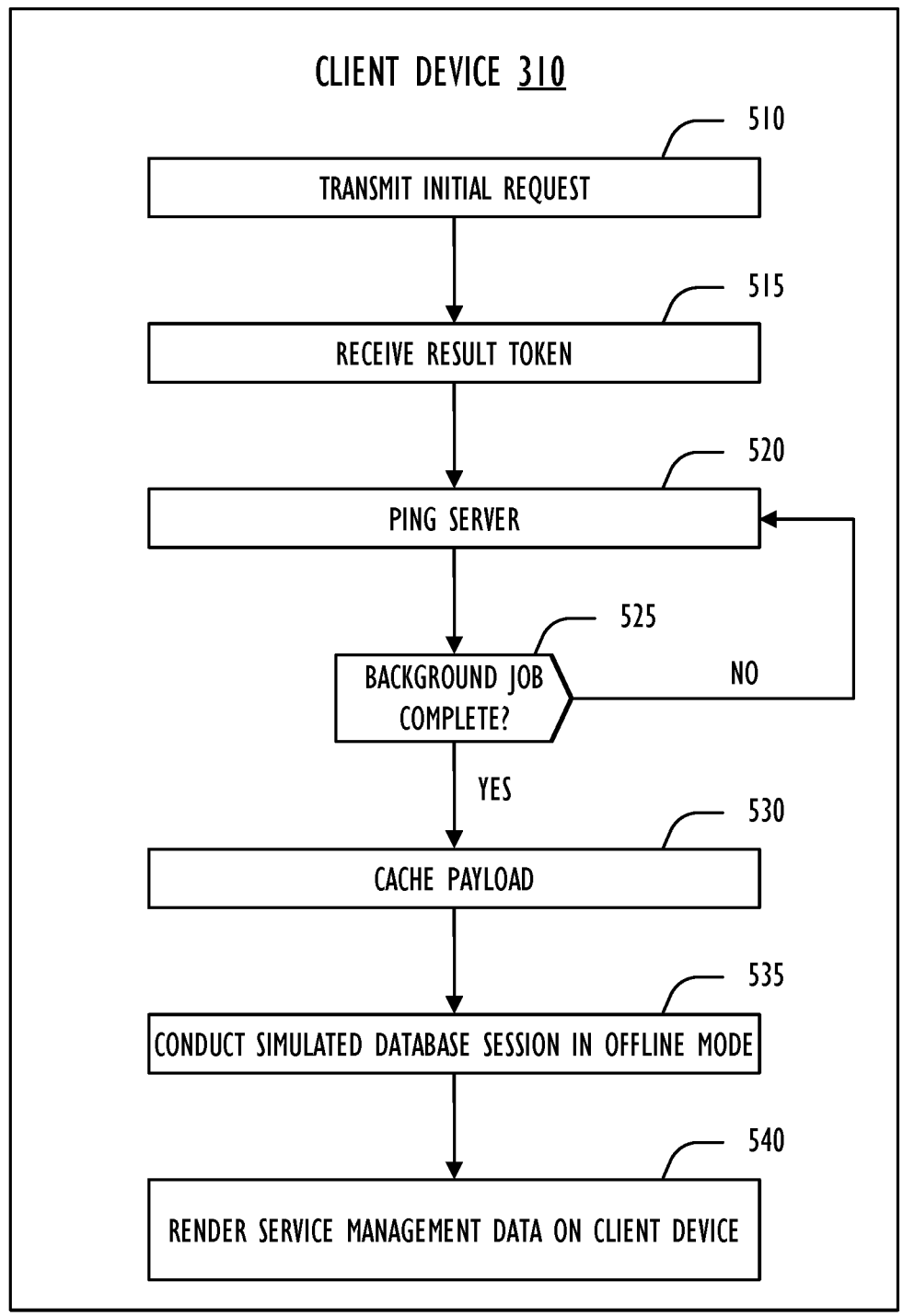
FIG. 5 shows flowchart 500 illustrating operation of client device 310 of FIG. 3 in accordance with one or more disclosed embodiments.

FIG. 5 shows flowchart 500 illustrating operation of client device 310 of FIG. 3 in accordance with one or more disclosed embodiments. Operation begins at block 510 with communication interface 321 transmitting initial request to sync API 364 of client instance 360 to synchronize data from database 370 onto local database 335. The initial request may include connection information to connect with and obtain identified data from sync API 364. For example, connection information may include data source name, import set table name, connection format (e.g., Oracle®), connection format ID, connection format port, authentication information (e.g., user ID and password), server information, query language (e.g., SQL), query statement, and the like. Oracle is a registered trademark of Oracle Corporation. In one embodiment, the initial request transmitted to sync API 364 may include a predefined sync definition query that may be hard coded into cross platform shared caching layer 325 to obtain data from a given table on database 370 as illustrated below:

Table: wm_order
Query:
active=true^expected_startBETWEENjavascript:gs.beginningOfToday( )@javascript:gs.endOfTomorrow( )^assigned_toDYNAMIC90d1921e5f510100a9ad2572f2b477fe^

Table: wm_task
Query:
active=true^assigned_toDYNAMIC90d1921e5f510100a9ad2572f2b477fe^expected_start BETWEENjavascript:gs.beginningOfToday( )@javascript:gs.endOfTomorrow( )^

Sync API 364 may receive the query and return the result token associated with the batch request record to execute the batch request on database 370 by triggering the background job as explained in detail in association with FIG. 4 above. The transmitted result token in received by communication interface 321 at block 515. At block 520, communication interface 321 periodically pings sync API 364 at client instance 360 with the result token, and receives a periodic response from sync API 364 on whether execution of the background job and generation of the payload responsive to the initial request has completed. In one embodiment, communication interface 321 may ping sync API 364 every predetermined period, for e.g., every second, to determine whether generation of the payload has completed. In another embodiment, communication interface 321 may ping sync API 364 occasionally at irregular intervals. In case communication interface 321 determines that generation of the payload has not completed based on response received from sync API 364 ("NO" at block 525), operation returns to block 520 where communication interface may again ping the server at the predetermined interval. On the other hand, if communication interface 321 determines that generation of the payload has completed ("YES" at block 525), operation proceeds to block 530 where communication interface 321 receives the payload transmitted from sync API 364 responsive to the initial request and communication interface 321 transmits the received payload to cross platform shared caching layer 325 for caching onto local database 335. Subsequently, at block 535, when client device 310 is operating in offline mode, responsive to a user request received from the application at application layer 315 on client device 310 to access data in offline mode, communication interface 321 may execute a call to simulation API 329 to access cached data on local database 335 and conduct a simulated database session between the application and local database 335. At block 540, controller 319 presents service management data obtained during the simulated database session in the offline mode from local database 335 on a UI of the application at the application layer 315.

Figure 6:
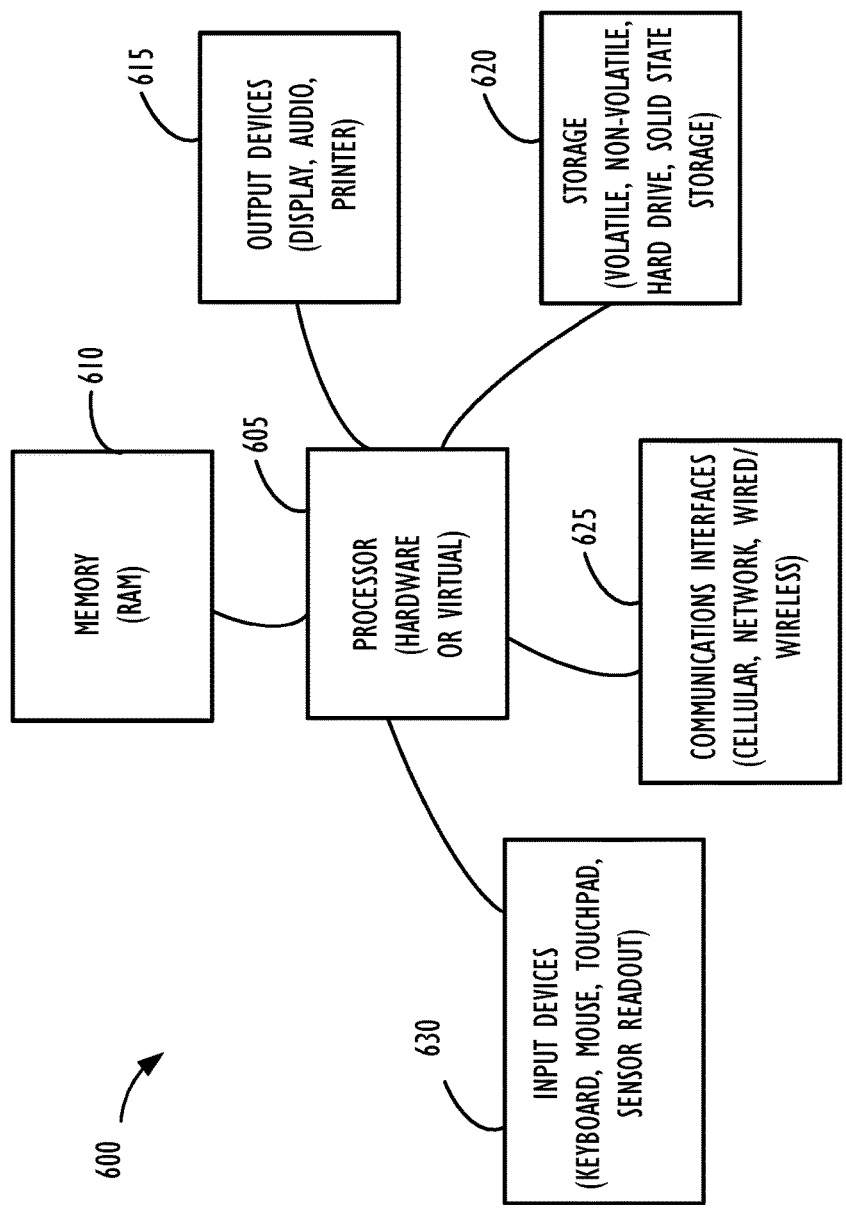
FIG. 6 illustrates a high-level block diagram 600 of a processing device (computing system) that may be used to implement one or more disclosed embodiments.

FIG. 6 illustrates a high-level block diagram 600 of a processing device (computing system) that may be used to implement one or more disclosed embodiments (e.g., cloud resources platform/network 110, client devices 104A-104E, client device 310, client instance 360, client instance 208, server instances 114, data centers 206A-206B, etc.). For example, computing device 600 illustrated in FIG. 6 could represent a client device or a physical server device and include either hardware or virtual processor(s) depending on the level of abstraction of the computing device. In some instances (without abstraction) computing device 600 and its elements as shown in FIG. 6 each relate to physical hardware and in some instances one, more, or all of the elements could be implemented using emulators or virtual machines as levels of abstraction. In any case, no matter how many levels of abstraction away from the physical hardware, computing device 600 at its lowest level may be implemented on physical hardware. As also shown in FIG. 6, computing device 600 may include one or more input devices 630, such as a keyboard, mouse, touchpad, or sensor readout (e.g., biometric scanner) and one or more output devices 615, such as displays, speakers for audio, or printers. Some devices may be configured as input/output devices also (e.g., a network interface or touchscreen display). Computing device 600 may also include communications interfaces 625, such as a network communication unit that could include a wired communication component and/or a wireless communications component, which may be communicatively coupled to processor 605. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 6, processing device 600 includes a processing element such as processor 705 that contains one or more hardware processors, where each hardware processor may have a single or multiple processor cores. In one embodiment, the processor 605 may include at least one shared cache that stores data (e.g., computing instructions) that are utilized by one or more other components of processor 605. For example, the shared cache may be a locally cached data stored in a memory for faster access by components of the processing elements that make up processor 605. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 6, the processing elements that make up processor 605 may also include one or more other types of hardware processing components, such as graphics processing units (GPUs), application specific integrated circuits (ASICs), field-programmable gate arrays (FPGAs), and/or digital signal processors (DSPs).

FIG. 6 illustrates that memory 610 may be operatively and communicatively coupled to processor 605. Memory 610 may be a non-transitory medium configured to store various types of data. For example, memory 610 may include one or more storage devices 620 that comprise a non-volatile storage device and/or volatile memory. Volatile memory, such as random access memory (RAM), can be any suitable non-permanent storage device. The non-volatile storage devices 620 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 620 may be used to store overflow data if allocated RAM is not large enough to hold all working data. The non-volatile storage devices 620 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 605. In one embodiment, the compiling process of the software program may transform program code written in a programming language to another computer language such that the processor 605 is able to execute the programming code. For example, the compiling process of the software program may generate an executable program that provides encoded instructions (e.g., machine code instructions) for processor 605 to accomplish specific, non-generic, particular computing functions.

After the compiling process, the encoded instructions may then be loaded as computer executable instructions or process steps to processor 605 from storage 620, from memory 610, and/or embedded within processor 605 (e.g., via a cache or on-board ROM). Processor 605 may be configured to execute the stored instructions or process steps in order to perform instructions or process steps to transform the computing device into a non-generic, particular, specially programmed machine or apparatus. Stored data, e.g., data stored by a storage device 620, may be accessed by processor 605 during the execution of computer executable instructions or process steps to instruct one or more components within the computing device 600.

A user interface (e.g., output devices 615 and input devices 630) can include a display, positional input device (such as a mouse, touchpad, touchscreen, or the like), keyboard, or other forms of user input and output devices. The user interface components may be communicatively coupled to processor 605. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 600 may comprise other components well known in the art, such as sensors, powers sources, and/or analog-to-digital converters, not explicitly shown in FIG. 6.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A computer system, comprising:
  one or more processors; and
  a memory, accessible by the one or more processors and storing instructions that, when executed by the one or more processors, cause the one or more processors to perform operations comprising:
    establishing an online database session in an online mode between a hosted client instance and a client application running on a mobile device, wherein the client application is associated with the hosed client instance;
    accessing, in response to the client application calling a representational state transfer application programming interface (REST API) of a database, service management incident data stored in the database during the online database session;
    receiving a request, via a sync API of the hosted client instance from the client application operating in an offline mode during performance of a field service management operation, to execute a batch request on the database;
    triggering a background job on the database to generate a payload in response to the request, wherein the payload comprises a portion of the service management incident data;
    pinging the sync API, via a communication interface, to determine whether execution of the background job is complete;
    receiving the payload upon completion of the background job; and
    transmitting the payload from the hosted client instance to the mobile device for
  caching onto a local database on the mobile device, wherein the client application is configured to access the local database in the offline mode.

2. The computer system of claim 1, wherein the mobile device is configured to access data from a cached portion of the service management incident data stored on the local database of the mobile device in a simulated database session in the offline mode.

3. The computer system of claim 2, wherein the simulated database session between the client application and the local database on the mobile device is generated via a simulation API of the local database.

4. The computer system of claim 3, wherein the client application accessing the service management incident data via the simulation API in the offline mode correlates in communication logic with the client application accessing the service management incident data via the REST API in the online mode.

5. The computer system of claim 1, wherein the operations comprise automatically determining whether the client application is to operate in the offline mode based on one or more operational conditions of the mobile device.

6. The computer system of claim 5, wherein the one or more operational conditions comprise geographic location information of a job site of a field service task assigned to the mobile device, elapsed time information of a time elapsed since a previous caching of data on the mobile device, or network information indicating a quality of a network connection between the mobile device and the hosted client instance, or any combination thereof.

7. The computer system of claim 1, wherein the operations comprise creating a result token to track servicing of the request; and
  transmitting the result token to the mobile device.

8. The computer system of claim 7, wherein to the operations comprise pinging the sync API with the result token to determine whether execution of the batch request is complete.

9. The computer system of claim 1, wherein the service management incident data comprises field service management data, comprising incident list data, incident form data, or record activity stream data, or any combination thereof.

10. The computer system of claim 1, wherein the operations comprise receiving the payload from the sync API in a denormalized format that is optimized for transmission to the mobile device for consumption in the offline mode.

11. The computer system of claim 1, wherein the payload corresponding to the portion of the service management incident data comprises field service management data that is associated with one or more field service tasks assigned to a user of the mobile device.

12. A non-transitory computer-readable medium, comprising computer-executable instructions that, when executed by one or more processors, cause the one or more processors to perform operations comprising:

establishing an online database session in an online mode between a hosted client instance and a client application running on a mobile device, wherein the client application is associated with the hosed client instance;

accessing, in response to the client application calling a representational state transfer application programming interface (REST API) of a database, service management incident data stored in the database during the online database session;

receiving a request, via a sync API of the hosted client instance from the client application operating in an offline mode during performance of a field service management operation, to execute a batch request on the database;

triggering a background job on the database to generate a payload in response to the request, wherein the payload comprises a portion of the service management incident data;

pinging the sync API, via a communication interface, to determine whether execution of the background job is complete;

receiving the payload upon completion of the background job; and transmitting the payload from the hosted client instance to the mobile device for caching onto a local database on the mobile device, wherein the client application is configured to access the local database in the offline mode.

13. The non-transitory computer-readable medium of claim 12, wherein the mobile device is configured to access data from a cached portion of the service management incident data stored on the local database of the mobile device in a simulated database session in the offline mode.

14. The non-transitory computer-readable medium of claim 13, wherein the simulated database session between the client application and the local database on the mobile device is generated via a simulation API of the local database.

15. The non-transitory computer-readable medium of claim 14, wherein the client application accessing the service management incident data via the simulation API in the offline mode correlates in communication logic with the client application accessing the service management incident data via the REST API in the online mode.

16. The non-transitory computer-readable medium of claim 12, wherein the operations comprise automatically determining whether the client application is to operate in the offline mode based on one or more operational conditions of the mobile device.

17. A method comprising:

establishing, via one or more processors, an online database session in an online mode between a hosted client instance and a client application running on a mobile device, wherein the client application is associated with the hosed client instance;

accessing, via the one or more processors, in response to the client application calling a representational state transfer application programming interface (REST API) of a database, service management incident data stored in the database during the online database session;

receiving a request via a sync API of the hosted client instance from the client application operating in an offline mode during performance of a field service management operation, to execute a batch request on the database;

triggering, via the one or more processors, a background job on the database to generate a payload in response to the request, wherein the payload comprises a portion of the service management incident data;

pinging the sync API, via a communication interface, to determine whether execution of the background job is complete;

receiving, via the one or more processors, the payload upon completion of the background job; and transmitting, via the one or more processors, the payload from the hosted client instance to the mobile device for caching onto a local database on the mobile device, wherein the client application is configured to access the local database in the offline mode.

18. The method of claim 17, comprising receiving, via the one or more processors, the payload from the sync API in a denormalized format that is optimized for transmission to the mobile device for consumption in the offline mode.

19. The method of claim 17, wherein the payload corresponding to the portion of the service management incident data comprises field service management data that is associated with one or more field service tasks assigned to a user of the mobile device.

20. The method of claim 17, wherein the service management incident data comprises field service management data, comprising incident list data, incident form data, or record activity stream data, or any combination thereof.

* * * * *